United States Patent

[11] 3,583,171

| [72] | Inventors | Charles M. Flynn<br>Allentown;<br>David J. Klee, Emmaus, both of, Pa. |
|---|---|---|
| [21] | Appl. No. | 811,461 |
| [22] | Filed | Mar. 28, 1969 |
| [45] | Patented | June 8, 1971 |
| [73] | Assignee | Air Products and Chemicals, Inc.<br>Allentown, Pa. |

[54] APPARATUS FOR COOLING ARTICLES TO LOW TEMPERATURES
8 Claims, 5 Drawing Figs.

[52] U.S. Cl............................................ 62/266,
62/303, 198/229, 134/200
[51] Int. Cl............................................ F25d 3/10,
F25d 23/02
[50] Field of Search................................ 62/303,
266, 380; 134/200; 198/229

[56] References Cited
UNITED STATES PATENTS

| 2,677,943 | 5/1954 | Nelson et al. | 62/380 |
| 3,226,947 | 1/1966 | Wakatsuki et al. | 62/303 |
| 3,403,527 | 10/1968 | Berreth et al. | 62/266 |
| 3,455,120 | 7/1969 | Schlemmer | 62/266 |

*Primary Examiner*—William E. Wayner
*Attorney*—Shanley and O'Neil

ABSTRACT: Apparatus for continuous cooling of articles to a low temperature including wall means defining an insulated, elongated passageway through which articles to be cooled are moved by conveyor means positioned in the lower portion of the passageway. The wall means forming the passageway include removable sections to provide access to the areas beneath the conveyor means to permit cleaning of the apparatus.

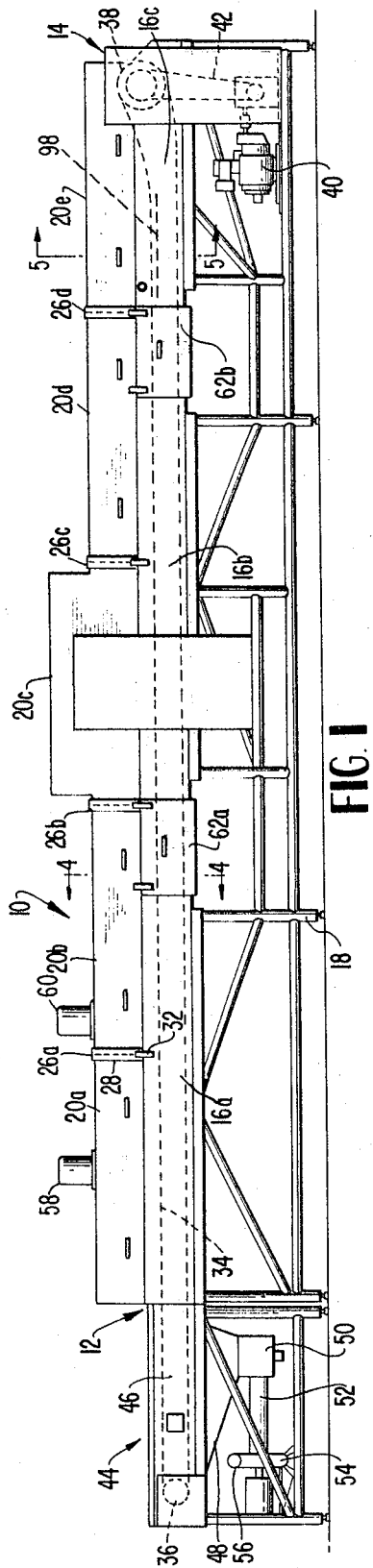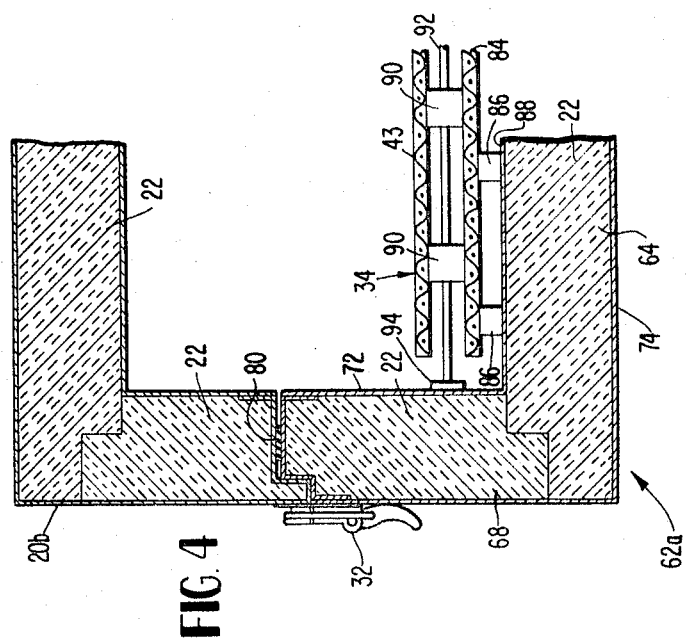
INVENTORS
CHARLES M. FLYNN
DAVID J. KLEE
BY Shanley & O'Neil
ATTORNEYS 3,583,171

APPARATUS FOR COOLING ARTICLES TO LOW TEMPERATURES

BACKGROUND OF THE INVENTION

This invention relates to apparatus for cooling articles and more particularly to an improved apparatus for continuous freezing of articles such as food or the like.

Apparatus for cooling articles are known in the art and have found increasing utility in the continuous cooling and freezing of articles of food. The prior apparatuses usually include an elongated passageway defined by insulated walls and a conveyor belt traversing the passageway lengthwise for moving the articles through the passageway. In certain of the prior apparatuses, the articles are sprayed directly with the liquefied gaseous material, such as liquefied nitrogen, usually near the exit end of the passageway. Such prior art apparatuses are capable of providing continuous food freezing operation and obtain a number of distinct advantages including high freezing rates, improved product characteristics and adaptability for processing a wide variety of foods.

While the prior apparatuses obtain many benefits, they have an inherent disadvantage in that fragments and minute particles of the articles being processed will accumulate in the lower areas of the passageway such as beneath the conveyor means. This disadvantage is especially critical in food-freezing operations since Federal and State sanitation laws require that such accumulations of food particles must be removed periodically.

Cleaning of prior apparatus of the type including an endless conveyor belt with upper and lower reaches within the passageway is particularly difficult since the reaches of the conveyor belt are closely spaced from each other and from the inside bottom wall of the passageway and there is no provision for ready cleaning of such spaces. Adequate cleaning ordinarily requires substantial dismantling of the apparatus including, at times, removal of the conveyor belt and related parts. Obviously, such procedure is time-consuming and requires undue downtime for cleaning. Furthermore, it has been found that the expansion joints required in the passageway structure collect particles of material that cannot be completely removed without specialized cleaning techniques and perhaps further dismantling of the apparatus. Also, during cleaning, water collects in the expansion joint structure and, when the apparatus is returned to low temperature operating conditions, the water freezes and causes buckling of the passageway structures.

The present invention provides apparatus of the foregoing type for cooling articles to low temperatures including novel structure which provides rapid and easy access to all internal areas of the passageway to permit complete cleaning of the apparatus with relative ease while at the same time overcoming the disadvantages resulting from expansion joint structure employed in prior apparatuses.

Other objects and advantages of the present invention will be appreciated from the following detailed description considered in connection with the accompanying drawings which disclose the preferred embodiment of the invention.

BRIEF DESCRIPTION OF THE DRAWINGS

In the drawings, in which similar reference characters denote similar elements throughout the several views:

FIG. 1 is a view in side elevation of an apparatus constructed in accordance with the principles of the present invention;

FIG. 4 is an enlarged fragmentary view in section taken along the line 4-4 of FIG. 1; and FIG. 5 is an enlarged fragmentary view in section taken along the line 5-5 of FIG. 1.

Detailed Description

Although the present invention is described in the environment of food freezing, it is to be expressly understood that the principles of the invention are applicable to apparatus for cooling articles other than food to and below freezing temperatures.

Figure 2:
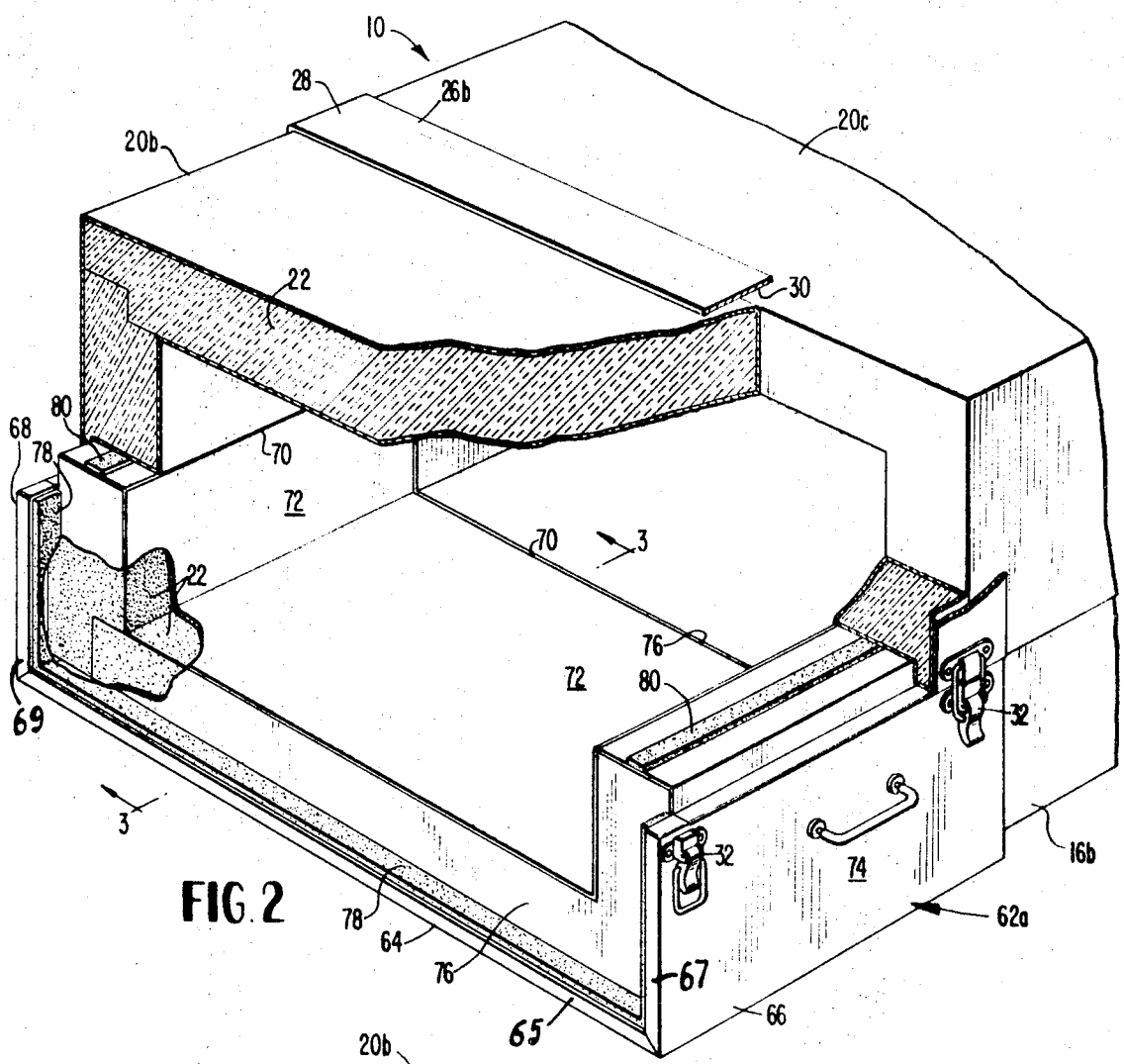
FIG. 2 is an enlarged three-dimensional view, partly broken away, of a portion of the apparatus of FIG. 1.

With reference more particularly to FIG. 1 of the drawings, a freezing apparatus embodying the principles of the present invention is shown therein including an elongated tunnel structure 10 defining a passageway of rectangular cross section having an entrance opening 12 and an exit opening 14. As seen from FIGS. 2 and 5, the structure 10 includes lower, upstanding U-shaped members 16a, 16b and 16c, supported by a floor-engaging frame 18, and a plurality of upper, inverted U-shaped members 20a, 20b, 20c, 20d, and 20e. As described below, the upper inverted U-shaped members are removable. The lower members 16 and the upper members 20 are of spaced wall construction enclosing therebetween insulating material 22 such, for example, as polyurethane foam or the like. As shown in FIG. 5, the longitudinally extending end surfaces of the sidewalls of the upper members 20 and the lower members 16 are in adjacent relationship to form the passageway and an elongated seal 24 is disposed between the adjacent end surfaces. The seal 24 may be formed of an elastomeric material suitable for the purposes and compatible with the environment. A seal is also provided between adjacent, transversely extending end surfaces of the upper members 20a and 20b, 20b and 20c, 20c and 20d and between 20d and 20e, by sealing means 26a, 26b, 26c, and 26d, respectively, which may be of similar construction. As shown in FIG. 2, sealing means 26b includes a strap 28 overlying the top and side marginal surfaces of the members 20b and 20c. The strap 28 may be secured, at both of its ends, to a portion of the lower part of the structure 10, such as to a member 16, by an overcenter clamp 32 which functions to pull the strap into tight engagement with overlaid surfaces of the members 20b and 20c, and may be provided with sealing material on its inside surface, not shown, to effect a good seal between adjacent upper members.

Conveyor means, preferably in the form of an endless belt 34 constructed of meshlike material, is provided for transporting articles along the passageway of the structure 10 from the entrance opening 12 to the exit opening 14. The belt is supported at opposite ends by rollers 36 and 38; the latter roller 38 being driven in a clockwise direction by a motor 40 and drive means 42 to move the upper reach 43 of the belt 34 in a direction from the entrance opening 12 to the exit opening 14. A loading station 44 located adjacent the entrance opening 12 includes an open-top cabinet 46 to provide an exposed length of the upper reach of the conveyor belt immediately forward of the entrance opening 12 upon which articles to be processed may be conveniently placed. The cabinet also includes converting bottom walls defining a vapor collecting chamber 48 communicating between the passageway and an outlet 50 connected by a conduit 52 to the inlet of a motor driven blower 54 to remove vapor through discharge conduit 56. Articles placed on the conveyor belt 34 at the loading station are carried by the belt through the passageway for heat interchange with vapor recirculating in successive zones at progressively decreasing temperature, then into a refrigerant contact zone where liquid refrigerant is sprayed directly onto articles, and then through the exit opening 14. The refrigerant contact zone is located within the upper member 20e and vapor recirculation zones are located within the upper members 20a-20d. The vapor recirculation may be effected by motor driven fans mounted within upper members 20a, 20b and 20c. The upper members preferably include radial type fans driven by motors 58 and 60. The liquid refrigerant spraying means and the vapor recirculation means are preferably located within the upper members to be removed therewith so as to leave the upper reach of the belt 34 unobstructed by equipment.

Figure 3:
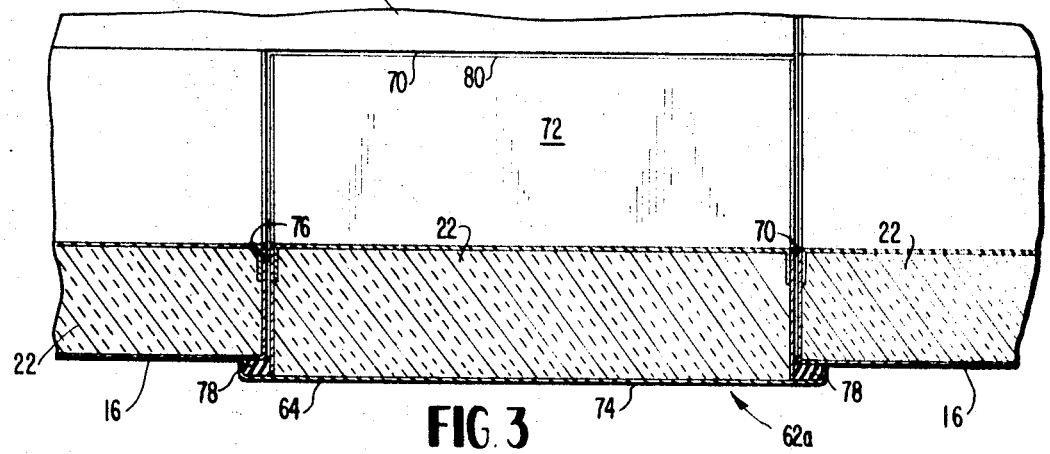
FIG. 3 is a fragmentary view in section taken along the line 3-3 of FIG. 2.

As mentioned above, the present invention provides novel structure for use with freezing apparatus of the foregoing character which makes possible rapid and complete access to all internal surfaces of the passageway to permit complete cleaning of the apparatus with relative ease. The novel structure includes the provision of removable members or covers disposed in the lower portion of the structure 10. As shown, removable member 62a is located between adjacent lower members 16a and 16b and removable member 62b is located between adjacent lower members 16b and 16c. The removable members 62a and 62b may be of similar construction and, as shown in FIGS. 2, 3 and 4, the removable section 62a comprises a U-shaped member having a bottom wall 64 and upstanding sidewalls 66 and 68, generally conforming to the cross-sectional configuration of the lower members 16. The adjacent, transversely extending end walls of the lower members 16a and 16b are longitudinally spaced to provide an opening 70 therebetween and the removable member 62a has a longitudinal dimension and is provided with means to sealable fit into the opening 70. The walls 64, 66 and 68 are preferably constructed in a manner similar to the upper and lower members and include spaced inner and outer panels 72 and 74 joined to end panels 76 to provide a double-walled U-shaped enclosure filled with insulating material. The longitudinal dimension of the removable member 62a is slightly less than the longitudinal spacing between the transverse end walls of the lower members 16a and 16b to permit the removable member 62a to easily enter the opening 70 and provide space for expansion. When the member 62a is inserted in the opening 70, the upper surface of the sidewalls 68 are adjacent the longitudinally extending end surfaces of the downwardly depending sidewalls of the upper members 20b and 20c and a strip 80 of sealing material is provided therebetween. Furthermore, the dimensions of the removable members are such that, when the removable members are inserted into respective openings, such as the removable member 62a into the opening 70, the inner panels 72 of the bottom and sidewalls lie in planes coincident with the planes of the inside bottom and side surfaces of the bottom members. The walls 64, 66 and 68 are provided with portions 65, 67 and 69, respectively, extending longitudinally beyond the transverse panels 76 at both ends of the removable member so as to overlap marginal portions of the outside bottom surface and outside sidewall surfaces of adjacent bottom members between which the removable member is inserted. The inner surfaces of the extensions 65, 67 and 69 carry a strip 78 of sealing material to provide a tightly sealed connection between the removable member and adjacent bottom members. As shown in FIG. 4, the removable members are held securely within respective openings by the use of overcenter clamps 32 acting between the removable member and the overlying upper member, on both sides of the structure 10. In certain installations, such as shown in FIG. 2, one side of the opening into which the removable member is inserted may be defined by the transverse end wall of a lower member 16 lying in a common transverse plane with the transverse end walls of adjacent upper members, such as members 20b and 20c. In such arrangement, the clamp 32 which secures the strap 28 into close contact with the outer marginal surfaces of the members 20b and 20c may comprise a pair of clamps which also function to secure the removable member 62a in the opening 70.

The cleaning problems presented by freezing apparatus of the type including an endless conveyor belt mounted with the upper and the lower reach located within the cooling passageway will be appreciated from FIGS. 4 and 5 which illustrate conveyor belt supporting structure.

As shown in FIG. 4, the lower reach 84 of the conveyor belt 34 is supported, substantially throughout the length of the passageway, by a plurality of longitudinally extending, transversely spaced supports 86 mounted on the inside bottom surface 88 of the upstanding U-shaped members 16. The upper reach 43 is supported on a plurality of longitudinally extending, transversely spaced supports 90 located between the upper reach 43 and the lower reach 84. The supports 90 are carried by transverse rods 92, the ends of which are received in U-shaped sockets 94 secured to the sidewalls of the upstanding U-shaped members. The supports 86 and 90 need not extend continuously throughout the length of the passageway and are constructed of low friction material suitable for low temperature environments such as ultra-high density polyethylene. A different arrangement for supporting the conveyor belt 34 in the region of the liquid refrigerant spraying zone is shown in FIG. 5. As shown, the lower reach 84 of the conveyor belt is supported by transversely spaced, longitudinally extending members 86 in the manner similar to the arrangement shown in FIG. 4; however, the upper reach 43 is supported by a plurality of transversely spaced, longitudinally extending members 96, which in turn are supported on a plate 98, and brackets 100 are provided to position the edges of the belt. Alternatively, members 96 may be eliminated and the upper reach may be supported directly by plate 98. The plate 98 extends transversely of the passageway between opposite sidewalls of the structure 10 and longitudinally of the passageway to underlie the area of liquid refrigerant sprayed downwardly onto the upper reach 43 from spraying heads 102 fed by conduit 104. A plurality of spraying heads 102 may extend in a row transversely of the passageway and a plurality of rows of such spray heads may be spaced longitudinally of the passageway. It will be appreciated that the above-described conveyor belt supporting structure, particularly the provision of the plate 98 in the liquid refrigerant spraying zone, provides numerous inaccessible areas within which particles of food may accumulate.

As mentioned above, during normal operation, particles of food accumulate within the apparatus and periodic cleaning of the apparatus is necessary to meet sanitation requirements. The cleaning operation of apparatus embodying the principles of the present invention may be accomplished as follows:

After the apparatus is shut down, the upper members 20 and the covers 62a and 62b are removed, and initial cleaning may be accomplished by spraying water or a suitable detergent solution downwardly onto the conveyor belt 34 and the interior surfaces of the lower members 16 in the direction of inclination of the structure 10, such as from the exit end 14 toward the inlet end 12. During this phase of the cleaning, the motor 40 is energized to drive the belt 34 so that the belt is washed and rinsed. Since the members 62a and 62b are removed to expose the openings 70 between adjacent bottom members 16, otherwise inaccessible areas are exposed for easy and complete cleaning by the use of water sprays and the like. It will be appreciated that removal of the members 62a and 62b make possible application of cleaning fluid longitudinally of the conveyor belt supporting structure, shown in FIGS. 4 and 5, at a number of different points spaced longitudinally of the structure, to insure complete removal of material that may accumulate beneath the conveyor belt, especially beneath the plate 98. Also, material collected between adjacent transverse surfaces of the lower members 16 and the removable members 62a and 62b readily removed as such surfaces are completely exposed.

The present invention thus provides an apparatus for cooling articles to low temperature, particularly for freezing food, of the type including an elongated passageway and an endless conveyor belt supported within the passageway, provided with novel structure which is easily and quickly operable to provide access to otherwise inaccessible areas of the apparatus and thereby permit cleaning of the apparatus and removal of particles of food that may accumulate in such areas. The novel concept of providing openings in the structure forming the elongated passageway and removable members closing such openings not only achieve the foregoing results but also makes it possible to eliminate the necessity of employing complicated expansion joint structure which increases the cost of manufacture and presents hidden areas for accumulation of food particles and problems of structural failure in the presence of moisture. The feature of providing removable members 26a and 26b of longitudinal dimensions less than the longitudinal dimensions of corresponding openings 70 with edges overlying in sealing relation outer marginal surfaces of the structure 10 defining the openings, provides an efficient expansion joint structure of relatively low cost which eliminates all cleaning problems.

Although only one embodiment of the invention has been disclosed herein, it is to be expressly understood that various changes and substitutions may be made without departing from the spirit of the invention as is well understood by those skilled in the art. For example, a number of removable members in addition to two may be employed. Reference therefore will be had to the appended claims for a definition of the limits of the invention.

We claim:

1. Apparatus for continuous cooling of articles comprising
an elongated tunnel having insulated top, side and bottom walls,
conveyor means in the tunnel for moving articles longitudinally through the tunnel,
means for applying cooling fluid to articles moving through the tunnel,
means in said bottom wall and in a part of at least one sidewall forming an opening in the tunnel located beneath the conveyor means, the opening being defined by longitudinally spaced transverse edges of the bottom wall and the one sidewall,
cover means for said opening,
the cover means including an insulated portion positioned in said opening between the longitudinally spaced transverse edges of the bottom wall and the one sidewall,
the insulated portion having longitudinally spaced transverse edges in contiguous relations with the longitudinally spaced edges of the bottom wall and the one sidewall,
the longitudinal dimension between the longitudinally spaced transverse edges of the insulated portion being less than the longitudinal dimension between the longitudinally spaced transverse edges of the opening to provide for relative movement between the cover means and the transverse sides of the opening thereby accommodating termal expansion in a longitudinal direction,
means forming a gastight seal between the cover means and the tunnel, and
means releasably securing said cover means to the tunnel.

2. Apparatus as defined in claim 1 in which the means forming a gastight seal between the cover means and the tunnel comprises
members joined to the longitudinally spaced transverse edges of the insulated portion of the cover means and extending longitudinally therefrom in opposite directions,
the members extending throughout the transverse edges of the insulated portion in overlying relation with marginal portions of the outside surfaces of the bottom wall and the one sidewall adjacent the opening,
and sealing means acting between the members and the marginal portions of the outside surfaces of the bottom wall and the one side wall.

3. Apparatus as defined in claim 2
in which the opening in the tunnel is formed by means in the bottom wall and in a part of both of the sidewalls,
in which the insulated portion is a U-shaped member, and
in which the members extend from the edges of the U-shaped member in overlying relation with marginal portions of the outside surfaces of the bottom wall and both sidewalls adjacent the opening.

4. In an apparatus for the continuous cooling of articles, said apparatus having top, side and bottom walls defining an elongated passageway of substantially rectangular transverse cross section; having conveyor means longitudinally traversing said passageway; and having means to apply cooling fluid to articles transported on said conveyor means; the improvement comprising access means in both the upper and lower portions of said passageway as follows:
access means in said lower portion including:
means defining at least one opening formed in said bottom wall and in part of both of said sidewalls, said opening being disposed beneath said conveyor means and extending transversely of the passageway;
an insulated cover means extending over said opening to close and seal said opening, said cover means comprising a U-shaped member formed to conform to portions of said bottom and sidewalls adjacent the transverse sides of the opening, said cover means having at least one edge disposed substantially transverse of said passageway; and
means releasably securing said cover means to said walls;
access means in said upper portion including:
a plurality of inverted U-shaped members composing said top wall and the upper portions of said sidewalls and disposed to abut one another along transversely disposed mating lines, said inverted U-shaped members being removable to expose at least the upper portion of said conveyor means and the lower internal portions of said walls for cleaning thereof; said inverted U-shaped members comprising the upper portions of said sidewalls to a level horizontally coincident with the uppermost edges of said cover means;
said one edge of said cover means which is disposed substantially transverse of said passageway being longitudinally coincident with a mating line between a pair of said inverted U-shaped members.

5. In an apparatus for the continuous cooling of articles, said apparatus having top, side and bottom walls defining an elongated passageway of substantially rectangular transverse cross section; having conveyor means longitudinally traversing said passageway; and having means to apply cooling fluid to articles transported on said conveyor means; the improvement comprising access means in both the upper and lower portions of said passageway as follows:
access means in said lower portion including:
means defining a least one opening formed in said bottom wall and in part of both of said sidewalls, said opening being disposed beneath said conveyor means and extending transversely of the passageway;
an insulated cover means extending over said opening to close and seal said opening, said cover means comprising a U-shaped member formed to conform to portion of said bottom and sidewalls adjacent the transverse sides of the opening, said cover means having at least one edge disposed substantially transverse of said passageway; and
means releasably securing said cover means to said walls;
access means in said upper portion including:
a plurality of inverted U-shaped members compose said top wall and the upper portions of said sidewalls and disposed to abut one another along transversely disposed mating lines, said inverted U-shaped members being removable to expose at least the upper portion of said conveyor means and the lower internal portions of said walls for cleaning thereof; said inverted U-shaped members comprising the upper portions of said sidewalls to a level horizontally coincident with the uppermost edges of said cover means;
said one edge of said cover means which is disposed substantially transverse of said passageway being longitudinally coincident with a mating line between a pair of said inverted U-shaped members;
the mating lines of said inverted U-shaped members and the adjacent transverse edges of said cover means and said walls are disposed in spaced relationship to one another to provide for relative movement therebetween thereby accommodating thermal expansion in said apparatus.

6. In an apparatus for the continuous cooling of articles, said apparatus having top, side and bottom walls defining an elongated passageway of substantially rectangular transverse cross section having conveyor means longitudinally traversing said passageway; and having means to apply cooling fluid to articles transported on said conveyor means; the improvement comprising access means in both the upper and lower portions of said passageway as follows:

access means in said lower portion including:

means defining at least one opening formed in said bottom wall and in part of both of said sidewalls, said opening being disposed beneath said conveyor means and extending transversely of the passageway;

an insulated cover means extending over said opening to close and seal said opening, said cover means comprising a U-shaped member formed to conform to portions of said bottom and sidewalls adjacent the transverse sides to the opening, said cover means having at least one edge disposed substantially transverse of said passageway; and means releasably securing said cover means to said walls;

access means in said upper portion including:

a plurality of inverted U-shaped members composing said top wall and the upper portions of said sidewalls and disposed to abut one another along transversely disposed mating lines, said inverted U-shaped members being removable to expose at least the upper portion of said conveyor means and the lower internal portions of said walls for cleaning thereof; said inverted U-shaped members comprising the upper portions of said sidewalls to a level horizontally coincident with the upper most edges of said cover means;

said one edge of said cover means which is disposed substantially transverse of said passageway being longitudinally coincident with a mating line between a pair of said inverted U-shaped members;

said means releasably securing said cover comprising, at least in part, an elongated retaining strip coextensively disposed with the mating line between a pair of inverted U-shaped members coincident with said one edge of said cover means, and means between the ends of said strip and the adjacent corners of said cover means to releasably interconnect said cover means and said strip.

7. Apparatus as defined in claim 6 including resilient seal means disposed between the cooperating edges of said cover means and said walls.

8. Apparatus as defined in claim 7 including an elongated, resilient seal means disposed on the inward surface of said strip to provide sealing between said abutting edges of said inverted U-shaped members.